(12) United States Patent
Masucci et al.

(10) Patent No.: US 6,498,667 B1
(45) Date of Patent: Dec. 24, 2002

(54) METHOD AND SYSTEM FOR PACKET TRANSMISSION OVER PASSIVE OPTICAL NETWORK

(75) Inventors: Jeffrey A. Masucci, Windham, NH (US); Louis Wojnaroski, Cambridge, MA (US); S. Martin Mastenbrook, Concord, MA (US); Barry D. Colella, Westford, MA (US); John F. Keisling, East Hampstead, NH (US); Agnes M. Masucci, Windham, NH (US)

(73) Assignee: Quantum Bridge Communications, Inc., North Andover, MA (US)

( * ) Notice: Subject to any disclaimer, the term of this patent is extended or adjusted under 35 U.S.C. 154(b) by 0 days.

(21) Appl. No.: 09/393,800

(22) Filed: Sep. 10, 1999

(51) Int. Cl.[7] ............................................. H04B 10/00
(52) U.S. Cl. ........................ 359/157; 359/125; 370/230
(58) Field of Search .................. 359/157, 110, 359/125, 137, 136; 370/108, 230

(56) References Cited

U.S. PATENT DOCUMENTS

| | | | |
|---|---|---|---|
| 5,173,899 A | 12/1992 | Ballance | 370/108 |
| 5,327,277 A | 7/1994 | Van Der Plas et al. | 359/140 |
| 5,398,129 A | 3/1995 | Reimann | 359/137 |
| 5,479,451 A | 12/1995 | Eldering et al. | 375/343 |
| 5,572,349 A | 11/1996 | Hale et al. | 359/137 |
| 5,574,584 A * | 11/1996 | Darcie et al. | 359/125 |
| 5,680,546 A | 10/1997 | Chiaretti et al. | 395/200.01 |
| 5,754,535 A | 5/1998 | Vandenabeele et al. | 370/321 |
| 5,774,244 A | 6/1998 | Tandon et al. | 359/125 |
| 5,790,287 A * | 8/1998 | Darcie et al. | 359/110 |
| 5,848,070 A | 12/1998 | Durvaux et al. | 370/442 |
| 5,864,413 A | 1/1999 | Feldman et al. | 359/125 |
| 5,864,414 A | 1/1999 | Barnsley et al. | 359/125 |
| 5,872,645 A | 2/1999 | Proctor | 359/136 |
| 5,896,213 A | 4/1999 | Nagahori et al. | 359/137 |
| 5,896,474 A | 4/1999 | Van Deventer et al. | 385/24 |
| 5,907,587 A | 5/1999 | Sokoler | 375/368 |
| 5,926,478 A | 7/1999 | Ghaibeh et al. | 370/395 |
| 5,930,018 A | 7/1999 | Effenberger | 359/158 |
| 5,930,262 A | 7/1999 | Sierens et al. | 370/442 |
| 6,101,025 A * | 8/2000 | Naganuma | 359/341 |
| 6,198,558 B1 * | 3/2001 | Graves et al. | 359/137 |
| 6,229,788 B1 * | 5/2001 | Graves et al. | 370/230 |

FOREIGN PATENT DOCUMENTS

EP        0 889 611 A1        1/1999

OTHER PUBLICATIONS

Denis J.G. Mestdagh; Fundamentals of Multiaccess Optical Fiber Networks; ISBN 0–89006; pp. 332–337; 1995.

ITU–T Recommendation G.983.1 "Broadbend Optical Access System Based on Passive Optical Networks (PON) ", Oct. 1998.

* cited by examiner

Primary Examiner—John Tweel
(74) Attorney, Agent, or Firm—Hamilton Brook Smith & Reynolds, P.C.

(57) ABSTRACT

A method and system provide an approach to support the aggregation of multiple broadband services including voice, high speed data, video and image through the transmission of packets and cells simultaneously over a passive optical network. The method of communication between a central terminal and plural remote terminals over a passive optical network includes transmitting downstream data from the central terminal to the plural remote terminals in successive downstream frames over a downstream network portion and transmitting upstream data from the plural remote terminals to the central terminal in respective upstream timeslots over an upstream network portion, the upstream timeslots forming successive upstream frames. The downstream data includes downstream packet data and downstream ATM cell data and the upstream data including upstream packet data and upstream ATM cell data. The upstream data can be transmitted from at least one of the plural remote terminals in multiple upstream timeslots which can be non-contiguous.

50 Claims, 7 Drawing Sheets

METHOD AND SYSTEM FOR PACKET TRANSMISSION OVER PASSIVE OPTICAL NETWORK

BACKGROUND OF THE INVENTION

A well-known optical fiber communications network is the passive optical network. Such networks typically use time division multiplexing from a central terminal controller to several remote customer terminals and time division multiple access from the customer terminals to the central terminal controller over one or two fibers. Known systems were designed to support circuit-based services including telephony, low speed data, and residential video. Passive optical networks have been used in limited deployments mainly due to the relatively high cost of components, system complexity and high price points for residential customer services.

Emerging broadband service providers seek to build network infrastructure to deliver multiple broadband services to business customers. Whereas traditional networks have been circuit-based, new network infrastructures are largely based on Internet Protocol (IP) packet-based or Asynchronous Transfer Mode (ATM) cell-based technologies. The ITU-T Recommendation G.983.1 "Broadband Optical Access System Based On Passive Optical Networks (PON)" discloses ATM cell-based PONs.

SUMMARY OF THE INVENTION

There is a need for a way to provide both packet-based and cell-based broadband services over a low cost, high bandwidth access network.

The present method and system provide an approach to support the aggregation of multiple broadband services including voice, high speed data, video and image through the transmission of packets and cells simultaneously over a PON.

Accordingly, a method of communication between a central terminal and plural remote terminals over a passive optical network having a downstream portion and an upstream portion includes transmitting downstream data from the central terminal to the plural remote terminals in successive downstream frames over the downstream network portion and transmitting upstream data from the plural remote terminals to the central terminal in respective upstream timeslots over the upstream network portion, the upstream timeslots forming successive upstream frames. The downstream data includes downstream packet data and downstream ATM cell data and the upstream data includes upstream packet data and upstream ATM cell data. The upstream data can be transmitted from at least one of the plural remote terminals in multiple upstream timeslots which can be non-contiguous.

According to the present approach, a communication system includes a shared medium, e.g., a passive optical network, having a downstream portion and an upstream portion, a central terminal and a plurality of remote terminals coupled to the shared medium for communicating with the central terminal. The central terminal transmits downstream data to the plural remote terminals in successive downstream frames over the downstream shared medium portion, the downstream data including downstream packet data and ATM cell data. The plural remote terminals transmit upstream data to the central terminal in respective upstream timeslots over the upstream shared medium portion, the upstream timeslots forming successive upstream TDMA frames, the upstream data including upstream packet data and ATM cell data.

Each downstream frame comprises a first number of downstream subframes each of which includes a second number of downstream timeslots. Each downstream timeslot has one of a plurality of downstream formats which include a downstream packet format for carrying downstream packet data and a downstream cell format for carrying downstream ATM cell data. The downstream subframe further includes a downstream communication channel for communicating downstream control information (e.g., provisioning information) to the remote terminals.

The downstream packet format for carrying downstream packet data includes a downstream packet header and a downstream packet payload for carrying a portion or all of a single downstream packet. The downstream packet header includes a first field identifying at least one of the plural remote terminals to receive the downstream packet data, a second field identifying a port of the at least one remote terminal identified in the first field to terminate the downstream packet data and a third field indicating whether the corresponding downstream packet payload includes an end of packet.

The downstream cell format for carrying downstream ATM cell data includes a downstream cell header and a downstream cell payload. The downstream cell header includes a first field identifying at least one of the remote terminals to receive the downstream ATM cell data. The downstream cell payload includes an ATM cell header having a first field identifying a port of the at least one remote terminal identified in the downstream cell header to terminate the downstream ATM cell data.

Each upstream timeslot includes an upstream header and an upstream payload. The upstream header includes a first field for a guard time, a second field comprising an upstream timeslot sync pattern for synchronizing phase alignment of the upstream data received at the central terminal, a third field comprising an upstream timeslot start delimiter for byte alignment of the upstream data received at the central terminal and a fourth field comprising an upstream communication channel for communicating upstream control information to the central terminal from the respective remote terminal.

Each upstream timeslot has one of a plurality of upstream formats which include an upstream packet format for carrying upstream packet data and an upstream cell format for carrying upstream ATM cell data.

The upstream packet format for carrying upstream packet data includes an upstream packet header and an upstream packet payload; the upstream packet header including a first field identifying a next packet start byte in the upstream packet payload and a second field indicating length of the upstream packet payload. The upstream packet payload includes at least a portion of a packet and can include multiple packets.

The upstream cell format for carrying upstream ATM cell data includes an upstream cell header and an upstream cell payload; the upstream cell header including a first field identifying a next ATM cell start byte in the upstream cell payload and a second field indicating length of the upstream cell payload. The upstream cell payload includes at least a portion of an ATM cell and can include multiple ATM cells.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
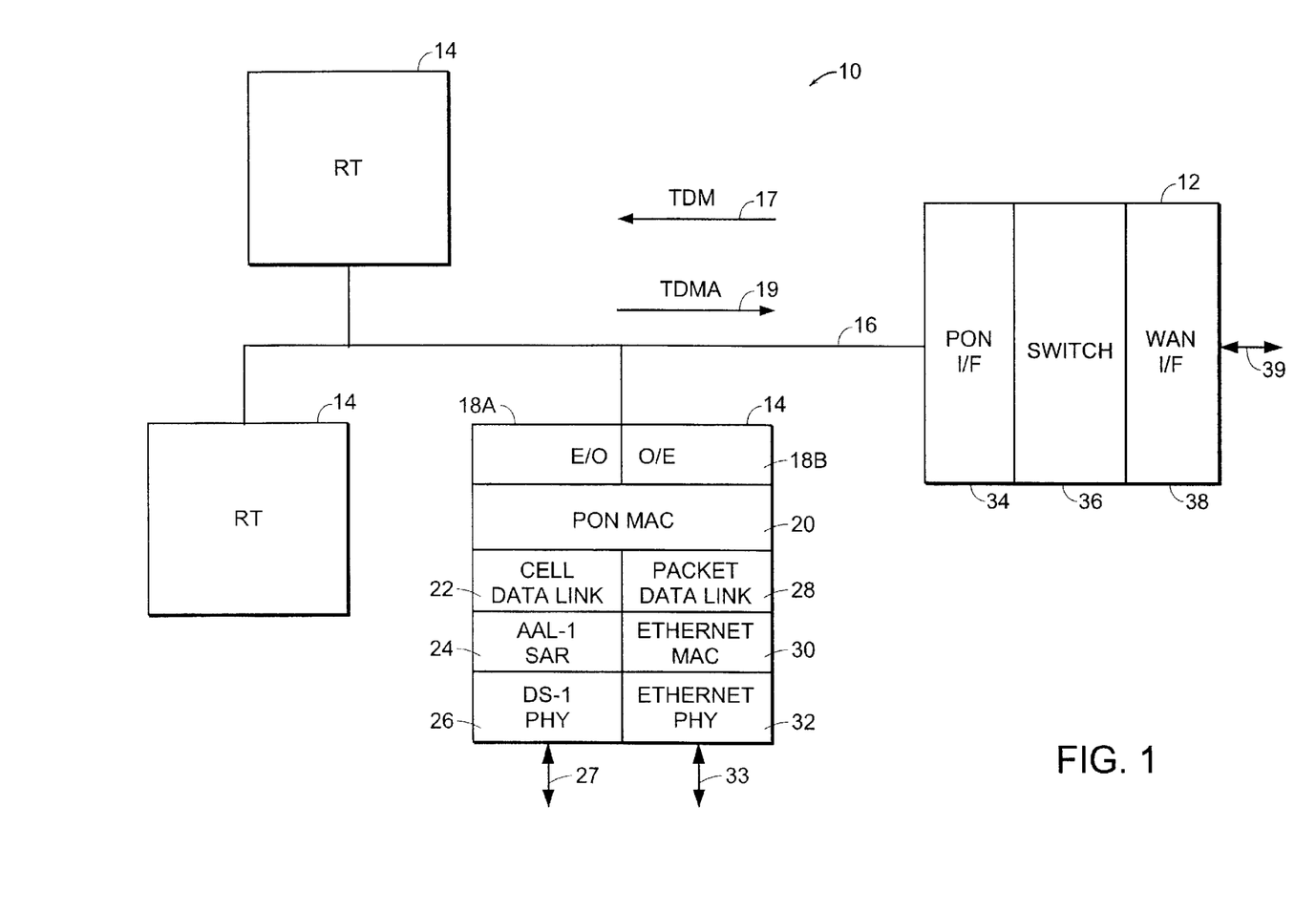
FIG. 1 is a block diagram of an embodiment of an optical access system.

FIG. 1 shows a block diagram of an optical access system 10 which embodies the principles of the present invention. The optical access system 10, which functions as a broadband optical access concentrator, includes three major elements: central terminal 12, remote terminals 14 and passive optical network (PON) 16. The system 10 provides a downstream data signal 17 over the PON 16 from the central terminal 12 to the remote terminals 14 in a time division multiplex (TDM) format. An upstream data signal 19 from the remote terminals 14 to the central terminal 12 over the PON 16 is provided using burst transmissions in a time division multiple access (TDMA) format. The downstream and upstream data formats, described further herein, support transmission of both IP packet data and ATM cells over the PON 16 for the delivery of packet-based and cell-based enhanced services.

The central terminal 12 is typically located in the central office (CO) or headend of a carrier and includes a PON interface 34, switch 36 and wide area network (WAN) interface 38. The central terminal 12 provides basic switching/forwarding functions between the PON 16 and an asynchronous transfer mode (ATM) WAN 39. In the case of packet traffic, the central terminal 12 originates and terminates ATM Adaptation Layer 5 (AAL5) functions to and from the WAN 39. Packet traffic on the PON 16 is carried without further encapsulation (except for the addition of a length field) as described further herein. ATM traffic, e.g., DS1/E1 streams, is simply transferred through the central terminal 12 to the destination remote terminal 14 based on the ATM address.

The switch 36 is a Layer 2/Layer 3 switching engine based on, for example, the AF5500 chip set from MMC Networks which provides the core functionality of a high performance (2.5 to 20 Gb/s) switch. The WAN interface 38 sources and sinks one or more SONET OC-12 (622.080 Mb/s) data streams that interface with the WAN 39.

Figure 2:
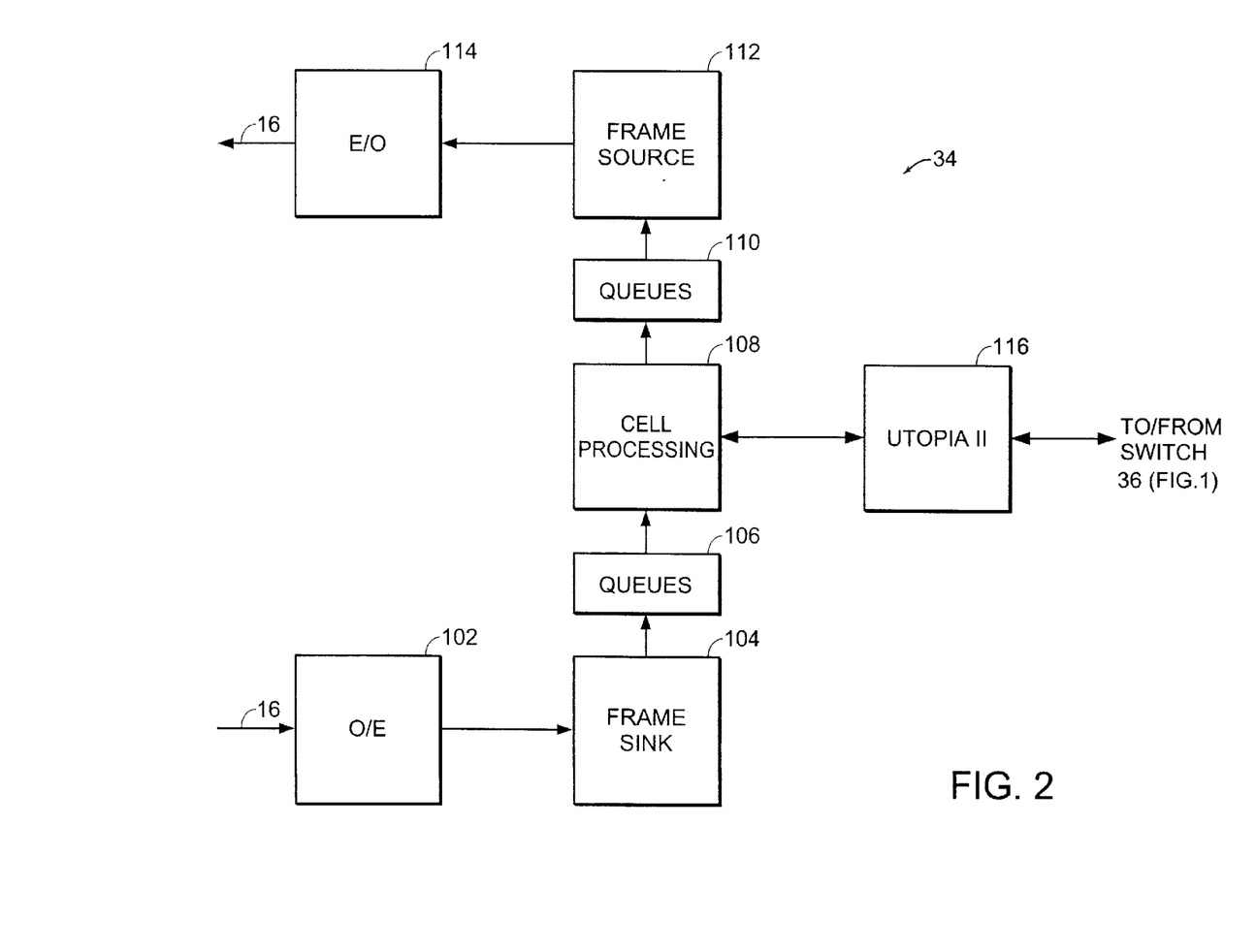
FIG. 2 is a block diagram of a passive optical network interface of the system of FIG. 1.

As shown in the block diagram of FIG. 2, the PON interface 34 sources downstream time division multiplex (TDM) based traffic to the PON 16 through electrical/optical interface 114 and sinks upstream time division multiple access (TDMA) based traffic from the PON 16 through optical/electrical interface 102. The respective E/O and O/E physical interface devices 114 and 102 are standard SONET continuous mode photonic devices (OC-12 transmitter in the downstream direction; OC-3 receiver in the upstream direction). The PON interface 34 further includes a frame sink block 104, queue blocks 106 and 110, cell processing block 108, frame source block 112 and Utopia II block 116. The frame source 112 is a field programmable gate array (FPGA) which sources downstream TDM frames. The frame sink 104 is an FPGA which sinks upstream TDMA frames. The cell processing block 108 passes ATM Adaptation Layer 1 (AAL1) cell flows transparently after adding only an 8-bit header. For packet flows, the cell processing block 108 provides a partial AAL5 segmentation and reassembly (SAR) function for packet data by stripping off the ATM cell header and creating a 16-bit downstream header. The Utopia II block 116 is an FPGA which performs a Utopia II/Serializer rate adaptation function between the cell processing block 108 and the switch 36 (FIG. 1).

Note that the terms downstream and upstream are used herein to refer to the direction of transmission signal flow with respect to the WAN interface. The downstream direction refers to signals from a WAN interface on the central terminal toward a remote terminal. The upstream direction refers to signals from a remote terminal toward a WAN interface on a central terminal.

Referring again to FIG. 1, the remote terminal 14 typically is located at the customer premises and includes electrical/optical (E/O) and optical/electrical (O/E) interfaces 18A, 18B, respectively, to the PON 16. The remote terminal 14 further includes cell data link 22, AAL1 SAR 24 and DS1 PHY 26 blocks to support ATM circuit emulation services (CES) over DS1 link 27, and packet data link 28, Ethernet MAC 30 and Ethernet PHY 32 blocks to support packet traffic over a 10/100 BaseT Ethernet link 33. It should be noted that other embodiments can include alternative interfaces for packet traffic such as High-Speed Serial Interface (HSSI) or RS-422.

The remote terminal 14 functions as a relay engine for packet traffic on the Ethernet port 33. The remote terminal 14 is provisioned with an Ethernet address and forwards all received traffic upstream to the central terminal 12. For DS1/E1 traffic, the remote terminal 14 provides an ATM interworking function. In particular, the remote terminal 14 receives continuous bit rate (CBR) traffic from a DS1 source through DS1 PHY 26, performs a segmentation function in AAL1 SAR 24 to create an ATM AAL1 cell stream and queues the cells for transmission upstream. Each DS1/E1 cell stream is assigned a permanent virtual circuit (PVC) for routing through the central terminal 12 and the connected ATM network 39. The bandwidth of the CBR DS1/E1 service is such that a remote terminal is assigned a timeslot per DS1/E1 service. Upstream timeslots are DS1/E1 specific but not PVC specific so that in the case of multiple DS1/E1 interfaces, the resulting AAL1 cell stream may be mixed among the timeslots provisioned for a particular remote terminal. Downstream ATM AAL 1 traffic is reassembled into a DS1/E1 flow and routed to the specific remote terminal based on PVC values. The downstream and upstream framing formats, including timeslots, are described further herein.

The remote terminal 14 formats packet and/or circuit traffic for transport upstream over the PON 16, selects the downstream traffic destined for the remote terminal, and outputs it in the required customer format. The E/O physical interface device 18A is a 155.520 Mb/s power leveling burst mode transmitter. The O/E physical interface device 18B is a standard SONET continuous mode OC-12 receiver. The PON MAC 20 is an FPGA which sinks downstream TDM traffic and sources upstream TDMA traffic. The PON MAC FPGA further routes the downstream TDM payload depending on the service.

Downstream IP packet traffic is sent to the packet data link 28 which formats the packets for the Ethernet MAC 30. The Ethernet (IEEE 802.3 standard) frames are sent from the Ethernet MAC 30 to an auto-sensing 10/100BaseT PHY device 32 which drives the twisted copper pair of the customer's 10 or 100 Mb/s LAN link 33.

Downstream ATM cell traffic is sent to the cell data link 22 for interfacing with an AAL1 SAR device 24 (such as the PMC-Sierra PM73121 AAL1gator II chip) for reassembly into DS1 service. The AAL1 SAR device drives one to four DS1 physical interface devices 26, each of which, in turn, outputs a standard 1.544 Mb/s DS1 signal to, for example, a customer's PBX on DS1 link 27.

For upstream IP packets, the Ethernet PHY 32 and the Ethernet MAC 30 devices strip the Ethernet header and forward the frame and the frame length to the packet data link 28. The packet data link 28 transfers the IP packets to the PON MAC 20 which places the data into the proper upstream timeslots.

Upstream DS1 traffic received from the DS1 PHY 26 is segmented by the AAL1 SAR 24, and is transferred to the PON MAC 20 as ATM cells via the cell data link 22. The PON MAC 20 places the ATM cells into the proper upstream timeslots, as provisioned by the central terminal 12.

The PON 16 connects the central terminal 12 to one or more remote terminals 14 via branching fiber optic tree, star-star or quasi-ring structures. The bidirectional PON 16 comprises two identical branching fiber optic trees or quasi-rings with one unidirectional portion dedicated to downstream traffic and the other unidirectional portion dedicated to upstream traffic. Alternatively, a pair of bidirectional networks can be used in a 1+1 protection mode.

Having described the elements of the optical access system 10, system service flows are now described for packet, DS1 and AAL5 transmissions, followed thereon by a description of the downstream and upstream data formats.

For upstream packet transmission, a packet arriving at a remote terminal 14 has its Ethernet framing (DA, SA, Type, and CRC) stripped and a length field is added to the head of the packet to facilitate removal from the PON 16. The IP packet is scheduled for transmission in the remote terminal's allotted upstream timeslot(s) on the PON 16. Regardless of the number of IP packets queued up for transmission, each packet is transmitted on the PON 16 in the order received by the remote terminal using as many timeslots as required. It should be understood that alternative embodiments can use priority queues to prioritize traffic.

The time slotted and potentially fragmented IP packet is received at the PON interface 34 of the central terminal 12 and segmented into ATM AAL5 cells, which are transferred to the switch 36. The switch 36 routes the ATM cells based on a lookup of the ATM cell header. The IP packet, now in several ATM cells, is scheduled, as appropriate for its associated PVC, for transmission on the WAN connection 39. The ATM cells are transmitted over the WAN interface at a provisioned Peak Cell Rate (PCR) for that PVC connection. The ATM traffic flow is reassembled at a destination service provider's router for subsequent Internet routing.

For downstream packet transmission, the service provider's router segments IP packets into an ATM AAL5 cell stream to the associated IP/PVC for ATM routing through the ATM switch environment. When the ATM/IP cell stream arrives at the central terminal 12, it is queued in the switch 36 for transmission on the PON 16. The queued packets per PVC are transferred to the PON interface 34 on a first come, first served basis. The central terminal 12 uses the PVC value of the received ATM stream to route the packet to the destination remote terminal 14. The packet data is reassembled into an IP packet, plus a length field, by a SAR function on the PON interface 34 and is transmitted (potentially fragmented) downstream. When the packet arrives at the remote terminal 14, it is encapsulated in an Ethernet frame. The previously ARPed Ethernet address of the CPE router is used as a destination address and the frame is transmitted.

DS1/E1 circuit emulation services are provided as an Unstructured Data Transfer (UDT) service. ATM CES DS1/E1 traffic is originated and terminated at the remote terminal 14. Each DS1/E1 port is assigned its own ATM PVC. The central terminal 12 performs only forwarding and cell pacing functions.

For upstream CES transmission, DS1/E1 traffic is received from a DS 1/E1 source at the remote terminal 14. An AAL1 SAR function segments the data into ATM cells, which are queued for transport on the PON 16. If the remote terminal 14 has multiple DS1/E1 sources, the resulting cells are queued in order of creation and may be multiplexed into any timeslot assigned to the remote terminal for DS1/E1 service. At least one timeslot per DS1/E1 service is assigned to the remote terminal.

When the DS1/E1 timeslot is received at the central terminal 12, the ATM cells are extracted and passed through the switch 36 and queued for output to the WAN port 39. The TDMA transmission upstream causes AAL1 traffic to potentially arrive at the central terminal 12 in bursts. These cells are transmitted on the WAN interface 39 at a re-paced cell rate of 4,107 cells per second (in the DS1 case) per VC cell stream. A cell rate of 4,107 cells per second transports one DS1 at 1.544 Mb/s+150 ppm. For E1 transport, a cell rate of 5,448 cells per second is used, which is 2.048 Mb/s+218 ppm.

For downstream CES transmission, AAL1 cells received at the WAN interface 38 are queued based on their PVC value for output to the PON 16. There is an AAL1 cell queue for each remote terminal 14. The cell queue must be large enough to accommodate all DS1/E1 connections provisioned at the remote terminals. The cells may be transferred from the switch 36 at the received rate, which should be rate paced.

When a timeslot for the target remote terminal is ready, the cells or partial cells are placed in the timeslot payload and transmitted on the PON 16. In the case of multiple DS1/E1 services on a remote terminal 14, the AAL1 cells are mixed among the available timeslots per remote terminal. At the remote terminal, the AAL1 cells are extracted from the received timeslot and transferred to the SAR device 24 where they are further queued for reassembly and transmission on the appropriate customer DS1/E1 port based on their PVC value.

IP packet traffic was described above. However, another type of packet traffic can be carried in support of transparent or virtual local area network (LAN) services. The primary difference between IP packet flows and LAN flows is in the amount and encapsulation technique required for these different services. The optical access system 10 uses the virtual circuit (VC) based multiplexing technique as described in Section 5 of RFC 1483. These structures include a format for routed packet data units (PDUs) which is used for IP packet traffic. The Ethernet frame, including addresses and LAN frame check sequence (FCS), is stripped. Another structure includes a format for bridged protocols which is used to carry bridged LAN traffic. In this case, a two byte header of 0x00-00 is prefixed onto the Ethernet frame. There are two options with this scheme. The first option is to encapsulate the entire prefixed Ethernet frame including the LAN FCS using AAL5. The second option does not encapsulate the LAN FCS.

Having described an embodiment of an optical access system and service flows, the data formats are now described. The downstream and upstream parts of the PON protocol are different due to both the asymmetry of the downstream/upstream data rates and the basic nature of the links. The 622.080 Mb/s downstream TDM data link is broadcast to all remote terminals 14; whereas, all remote terminals share the 155.520 Mb/s upstream data link via TDMA timeslots. The downstream and upstream data framing formats accommodate both packet and circuit emulation services (e.g., DS1, E1).

Downstream Data Format

Every remote terminal 14 connected to PON 16 receives the full 622.080 Mb/s downstream transmission from the central terminal 12. Each remote terminal is provisioned by the central terminal to terminate only the downstream data that is meant for it. The rest of the downstream data is ignored by that particular remote terminal.

Figure 3:
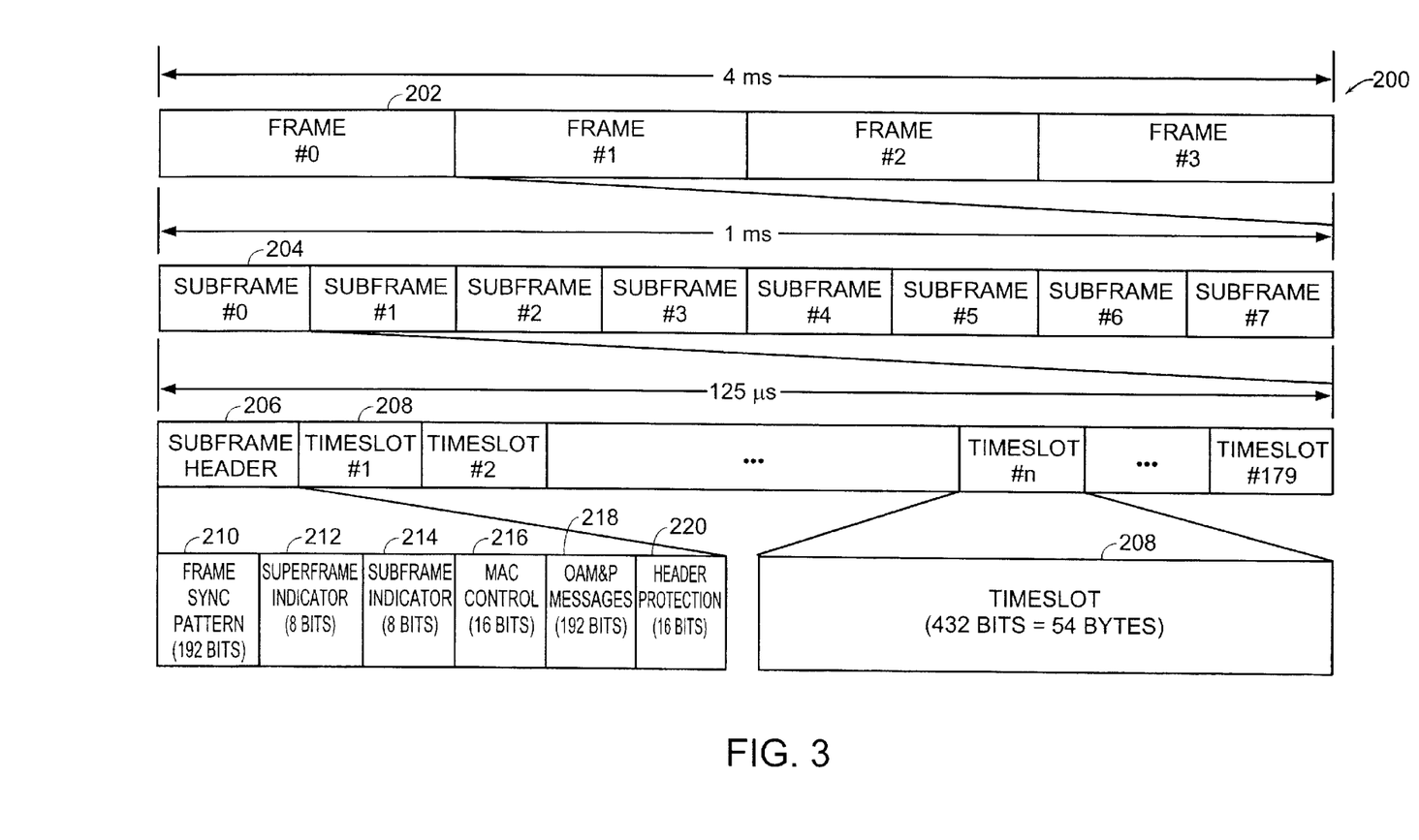
FIG. 3 illustrates a downstream superframe, frame and subframe data signal format for the system of FIG. 1.

Referring now to FIG. 3, the data format used on the downstream portion of the PON 16 is a 4 ms repeating synchronous superframe structure 200 which includes four TDM frames 202. The TDM bit time is $(622.080 \text{ Mb/s})^{-1} \approx 1.61$ ns. The downstream TDM frame 202 is based on a 1 ms repeating format. The TDM frame 202 is divided into eight 125 µs subframes 204 comprising 77,760 bits=9,720 Bytes each. Each downstream subframe 204 is divided into 180 units (one subframe header 206 and 179 downstream timeslots 208), each of which is 432 bits (54 bytes) long.

The downstream subframe header 206 of each subframe 204 is terminated at every remote terminal 14. Note that a given remote terminal may be provisioned to terminate multiple downstream timeslots 208. Each downstream subframe header is divided into six fields: a 192-bit frame synchronization pattern (FSP) 210; an 8-bit superframe indicator (SPFI) 212; an 8-bit subframe indicator (SFI) 214; a 16-bit MAC control 216; a 192-bit operations, administration, maintenance and provisioning (OAM&P) message field 218; and a 16-bit subframe header protection (SFHP) 220.

The downstream FSP field 210, which is used to achieve frame and byte alignment at every remote terminal, is preferably the same well-known 24-byte pattern used in the SONET STS-12 frame. In SONET terminology, this pattern is twelve A1 Bytes followed by twelve A2 Bytes, where A1="11110110"=0xF6 and A2="00101000"=0x28.

The superframe 200 is a high order framing structure. A superframe is a 4 ms frame that delineates four 1 ms frames 202. The 8-bit SPFI 212 indicates which frame 202 of a set of four such frames is being transmitted (counts 0–3, incrementing each downstream frame). The downstream subframe 204 containing SPFI=0 indicates the start of the 4 ms downstream superframe 200. The value SPFI=0 always occurs in a subframe with SFI=0 so that the beginning of the superframe 200 is always aligned with the beginning of a frame 202.

The downstream SFI 214 is similar to the H4 byte used in SONET. This one-byte field in the downstream subframe format takes on the values 0 through 7 decimal in successive downstream subframes 204. The downstream subframe containing SFI=0 indicates the start of the 1 ms downstream frame 202 and is used to establish the start of the 1 ms upstream frame (described herein) at each remote terminal.

The MAC control field 216 provides real-time control over certain actions of the PON MAC 20 (FIG. 1) of the remote terminal. For example, the MAC control field provides for fast hardware-based event synchronization for encryption key updates without software intervention on the remote terminal. Since the PON MAC 20 needs to respond quickly to the MAC control field and cannot wait for a CRC integrity check, this field has its own parity bit. The least significant bit (LSB) of the MAC control field is an ODD parity over the upper 15 bits of the field. The MAC control field bits are defined as follows:

| Bit 15 | Range |
|---|---|
| Bit 14 | Update encryption key (shadow_key -> active_key) |
| Bit 13–1 | Undefined |
| Bit 0 | Odd parity on bits 15–1 |

Downstream OAM&P messages are byte and message aligned to the frame synchronization pattern 210. These messages occupy a 24-byte field in each downstream subframe 204, which represents a 1.5360 Mb/s broadcast communication channel from the central terminal to every remote terminal. Downstream OAM&P messages are described further herein.

As shown in FIG. 3, the SPFI, SFI, MAC control and the OAM&P Message fields are protected by the 16-bit subframe header protection field 220. This field uses a cyclic redundancy check (CRC-16) code.

Figure 4A:
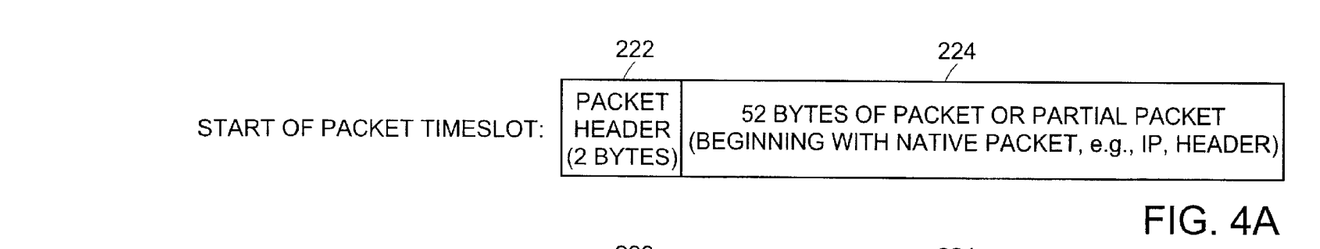
FIGS. 4A, 4B and 4C illustrate a format for a downstream packet timeslot
Figures 4B, 4C, 4D:
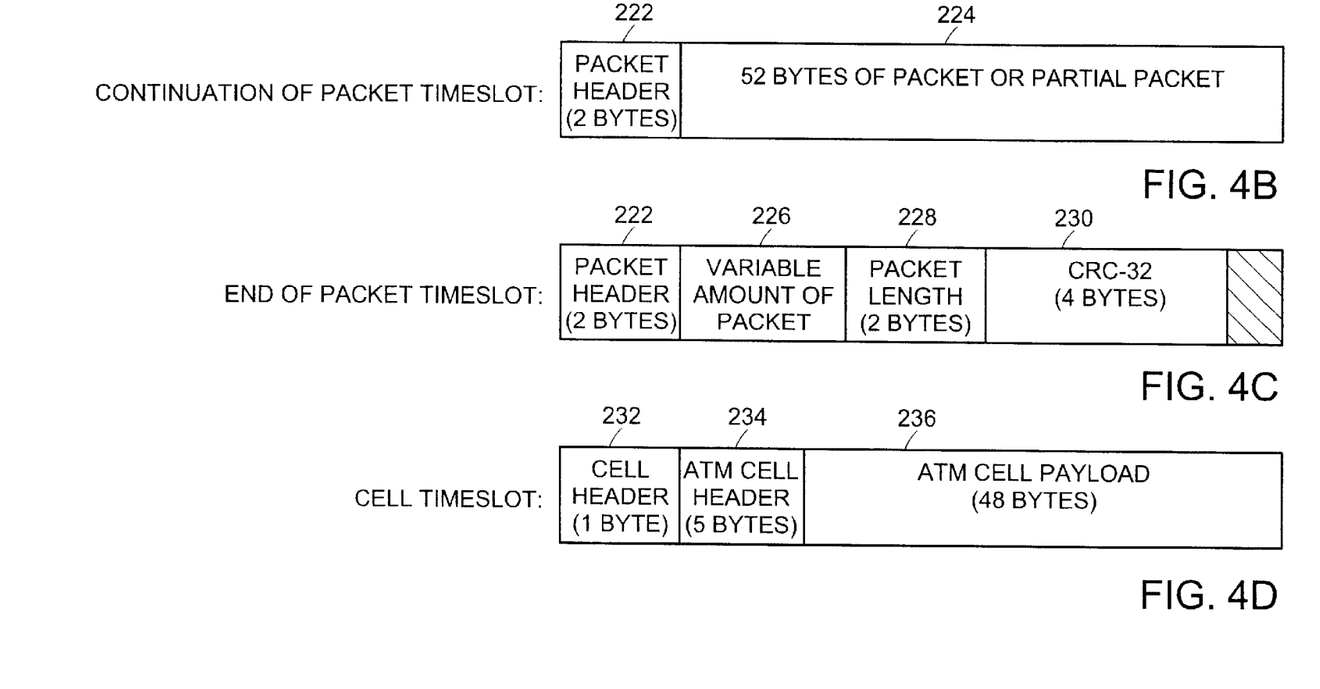
FIG. 4D illustrates a format for a downstream cell timeslot for the subframe of FIG. 3.

As shown in FIGS. 4A to 4D, each of the downstream timeslots 208 is divided into two fields: a packet header 222 or cell header 232 and a timeslot payload 224. The interpretation of both of these fields is different depending upon whether the downstream timeslot is carrying packet or ATM cell traffic. The header fields 222, 232, described below, provide concise timeslot identification and routing information. As shown in FIG. 4A, a downstream timeslot that includes a start of a packet begins the timeslot payload 224 with the native packet, e.g., IP, header and packet payload. A timeslot that includes a continuation of a packet uses the timeslot payload 224 for packet payload as shown in FIG. 4B. A timeslot that includes an end of a packet begins the timeslot payload with a variable amount of packet payload 226, followed by a 16-bit packet length field 228 and a 32-bit CRC-32 field 230, as shown in FIG. 4C. In contrast, FIG. 4D shows a cell timeslot that includes a cell header 232 (described below) and divides the timeslot payload into a 5-byte ATM cell header 234 and a 48-byte ATM cell payload 236.

The packet header 222 is a 16-bit field for a packet timeslot. The cell header 232 is an 8-bit field for an ATM cell timeslot.

Figure 5A:
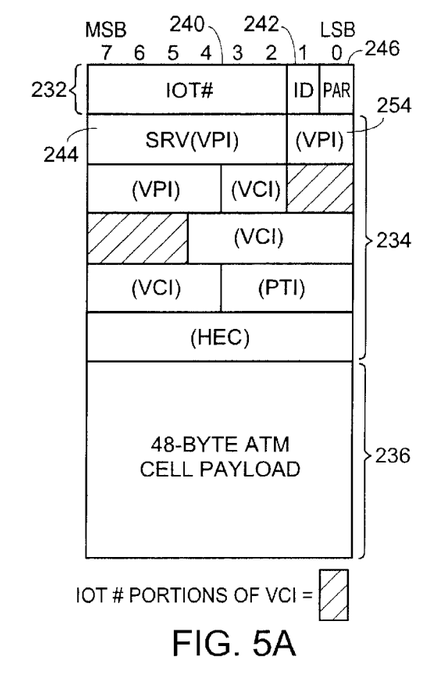
FIGS. 5A and 5B illustrate fields for respective downstream cell and packet timeslot formats.

The 8-bit cell header 232 includes the following subfields as shown in FIG. 5A:

IOT # subfield 240 (6 bits)—Indicates the numerical designation of the remote terminal on the PON (0 to 63 decimal).

ID subfield 242 (1 bit)—Set to "0"; indicates cell timeslot.

PAR subfield 246 (1 bit)—Odd parity over the first 16 bits of the timeslot, i.e., the cell header 232 plus the first byte of the ATM cell header 234. This subfield prevents a bit error in the ID bit from being missed. Although not part of the cell header 232, the upper 5 bits of the VPI/NNI address space (found in the next byte 254) are used as a service (SRV) subfield 244 to indicate which port of the remote terminal terminates the ATM cell. This is equivalent in function to the SRV field described below for a packet timeslot.

Figure 5B:
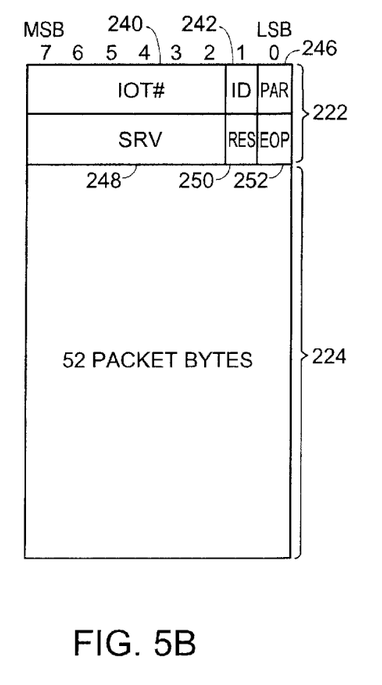

The 16-bit packet header 222 has the following subfields as shown in FIG. 5B:

IOT # subfield 240 (6 bits)—Indicates the numerical designation of the remote terminal on the PON (0 to 63 decimal).

ID subfield 242 (1 bit)—Set to "1"; indicates packet data timeslot.

PAR subfield 246 (1 bit)—Odd parity over the first 16 bits of the packet header 222.

SRV subfield 248 (6 bits)—Indicates a "service" or "port" number, e.g., the Ethernet port assigned to this packet stream.

RES subfield 250 (1 bit)—Reserved bit.

EOP subfield 252 (1 bit)—When set to "1", this subfield indicates end of packet (EOP) and that the last two bytes of the 32-bit CRC field 230 (FIG. 4C) (AAL5 is always even byte aligned) is contained within the timeslot payload 224.

Broadcast timeslots intended for all remote terminals are indicated by a value for the IOT # subfield 240 consisting of all "1"s. Note that if the value of the IOT # subfield does not equal "111111" or does not match the local value of the remote terminal's address, the downstream timeslot 208 is not terminated by the particular remote terminal.

As shown in FIGS. 5A and 5B, the downstream timeslot payload 224 is organized differently depending on whether the payload contains packet data or ATM cell data. For ATM cells, the second byte of the downstream timeslot 208 is the first byte of the five-byte ATM cell header 234, and the upper portion of the VPI value. As noted previously, the upper portion (bits 7–3) of the first byte of the ATM cell header 234 is an SRV subfield that is used to route the cell to the appropriate ATM cell termination device. The remainder of the ATM cell header 234 provides the standard ATM cell header fields (i.e., VPI/VCI, PTI and HEC fields) and will not be described further.

The downstream optical signal uses binary non-return-to-zero (NRZ) line coding. This optical signal is scrambled to assure an adequate number of transitions (i.e., zeros to ones, and ones to zeros) for line rate clock recovery at each remote terminal receiver. The scrambler used is a frame synchronous scrambler that can be applied identically at the central terminal transmitter and the remote terminal receiver. This scrambler is similar to the SONET Section layer scrambler defined in Bellcore GR-253.

The downstream signal is scrambled (i.e., scrambled at the central terminal transmitter and descrambled at the remote terminal receiver) with a frame synchronous scrambler of sequence length 127, operating at the optical line rate (622.080 Mb/s). The generating polynomial for the scrambler is $x^7+x^6+1$.

The shift register generator of the scrambler is reset to "1111111" on the most-significant bit of the byte following the final byte of the frame synchronization pattern 210 (FIG. 3) (i.e., the byte following the last A2 Byte). That bit and all subsequent bits to be scrambled are added, modulo 2, to the output from the $X^7$ position of the scrambler. The scrambler runs continuously from that bit on throughout the remainder of the downstream subframe. The scrambler is reset on every downstream subframe. Note that the frame synchronization pattern bytes (12 A1s followed by 12 A2s) are not scrambled.

Because this scrambler provides a sufficient density of "0"-to-"1" and "1"-to-"0" transitions in the downstream optical signal, a standard, ac-coupled continuous mode SONET OC-12 receiver and clock recovery unit can be used in the remote terminal.

Upstream Data Format

The frame format used on the upstream portion of the PON 16 is a time division multiple access (TDMA) frame formed from burst transmissions by the remote terminals 14. The upstream TDMA frame carries both packet and circuit emulation (cell based) services. Two different upstream frame formats are available: one optimized for DS1 (1.544 Mb/s) circuit transport and another optimized for E1 (2.048 Mb/s) circuit transport. Note that both such formats accommodate packet data.

Figure 6:
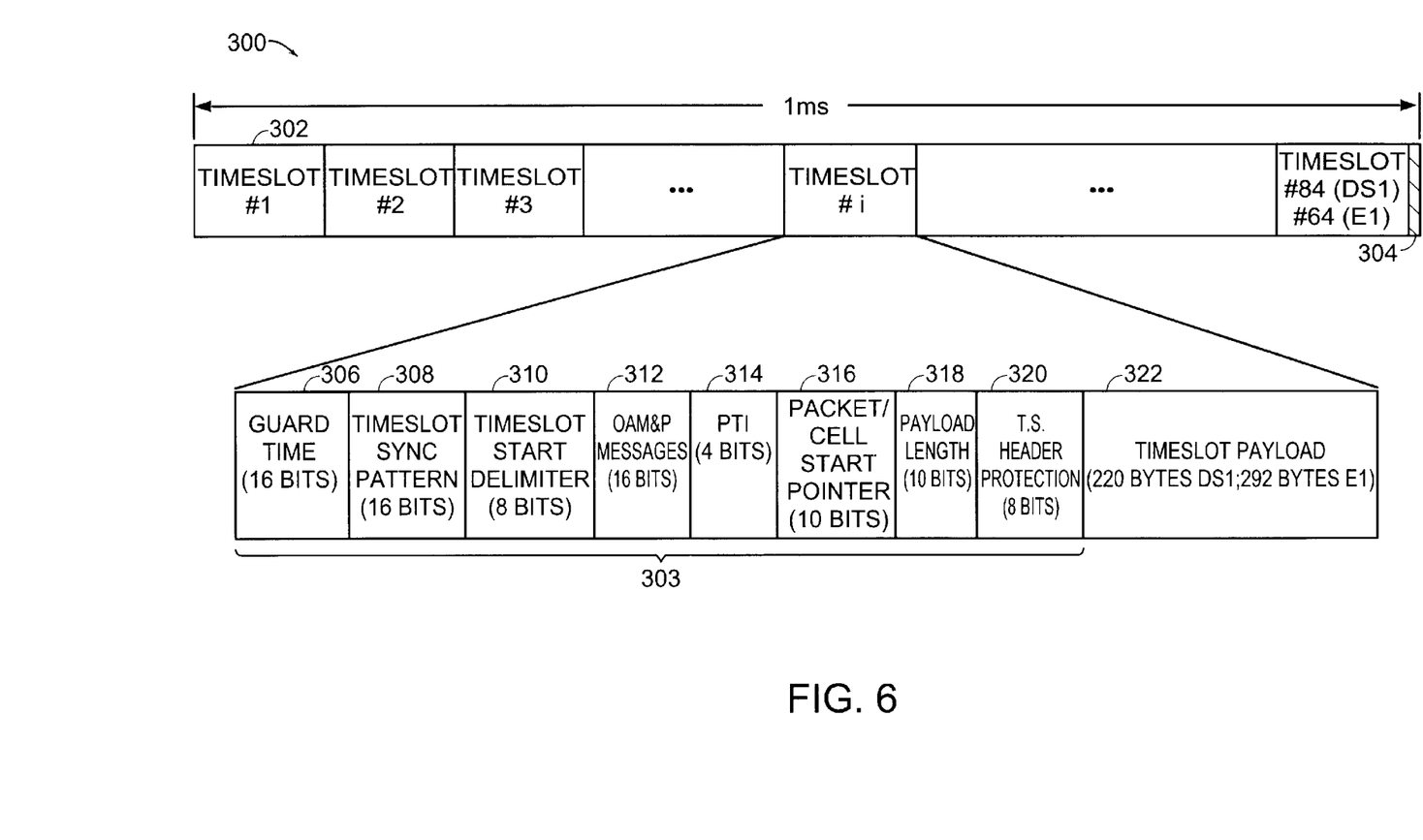
FIG. 6 illustrates an upstream frame data signal format for the system of FIG. 1.
Figure 7A:
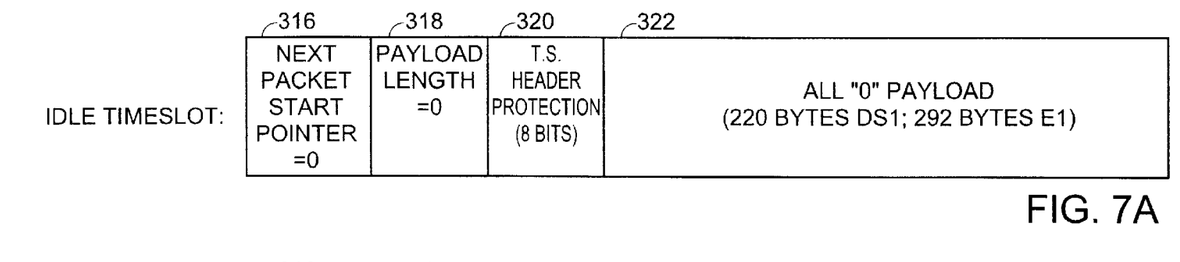
FIGS. 7A, 7B and 7C illustrate respective formats for upstream idle, packet and cell timeslots.
Figure 7B:
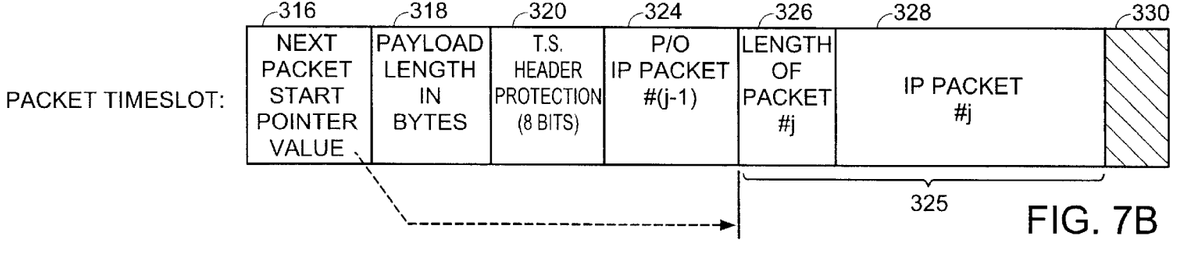
Figure 7C:
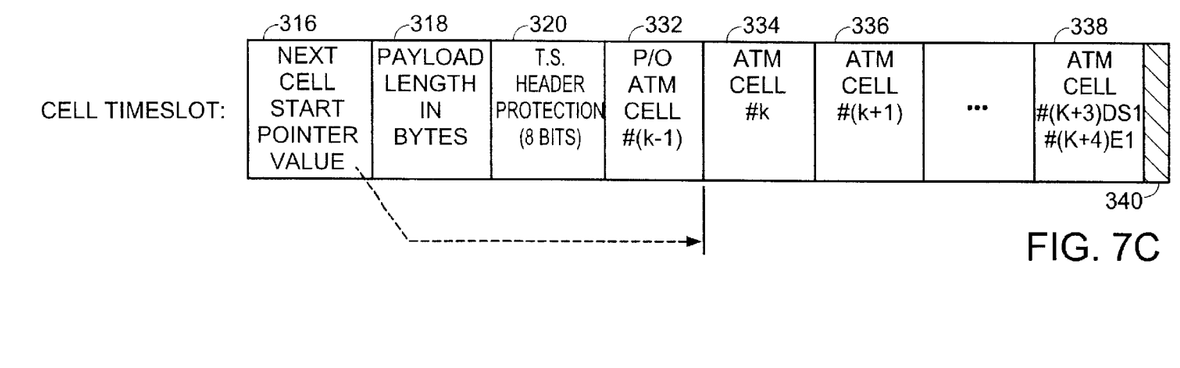

The TDMA frame is based on a 1 ms repeating format as shown in FIG. 6. The TDMA bit time is 155.520 Mb/s⁻¹≈6.43 ns. The upstream TDMA frame 300 is divided into 84 timeslots for DS1 type format (64 timeslots for E1 type) 302. Each remote terminal 14 is provisioned via OAM&P messages with the specific upstream timeslot or timeslots 302 it can use for upstream transmission. Further, timeslots are provisioned to be service specific, as in the case of a packet or cell timeslot. FIG. 7A shows the format of an "idle" timeslot while FIGS. 7B and 7C show packet and cell timeslot formats, respectively.

Each upstream timeslot 302 comprises an upstream timeslot header 303 and an upstream timeslot payload 322. The timeslot header 303 is divided into eight fields: a 16-bit guard time (GT) 306; 16-bit timeslot synchronization pattern (TSP) 308; 8-bit timeslot start delimiter (TSD) 310; 16-bit OAM&P messages (OAM&P) 312; 4-bit payload type indicator (PTI) 314; 10-bit next packet start pointer (PSP) or next cell start pointer (CSP) 316; 10-bit payload length (PL) 318; and 8-bit timeslot header protection (TSHP) 320. The length of the timeslot payload field 322 is 220 bytes for a DS1 type format and 292 bytes for an E1 type format.

To allow a ranging safety margin and time to turn on and off laser transmitters in the E/O 18A of the remote terminals 14 (FIG. 1), the guard time 306 in the upstream timeslots 302 is specified as 16 bits. Note that unused bits 304 at the end of the TDMA frame 300 provide an extra guard period.

The timeslot synchronization pattern field 308 comprises a fixed 16-bit alternating "10" pattern: "1010101010101010". This pattern is used by the upstream receiver in the central terminal 12 to realign to the new phase of an incoming timeslot 302.

The timeslot start delimiter field 310 is a fixed 8-bit pattern ("11100010"=0xE2) with a high autocorrelation function that is used to align the upstream receiver in the central terminal 12 to the byte boundaries of an incoming timeslot 302.

The OAM&P message field provides a dedicated 16 kb/s per timeslot upstream OAM&P channel for communicating from each in-service remote terminal 14 to the central terminal 12 every frame 300.

The payload type indicator field 314 indicates the nature of the payload according to the following values:

0=ATM cells
1=packets

The PTI field 314 provides the upstream central terminal 12 an in-band assist in parsing and delineating the payload field.

The next packet start pointer (PSP) or next cell start pointer (CSP) 316 is used differently depending on the type of payload in the upstream timeslot. If the timeslot payload 322 carries packet data, the value in the PSP field gives the starting byte number of the first new packet in the timeslot payload. If the current timeslot does not contain the beginning of a new packet, then the PSP field is set to all "1"s, which is always an invalid value. If the timeslot payload 322 carries 53-Byte ATM cells, the value in the CSP field gives the byte number in the timeslot payload that is the first byte of the next full ATM cell.

If the timeslot contains an "idle" payload, the PSP/CSP field is all "0"s and the timeslot payload is all "0"s as shown in FIG. 7A.

The payload length field 318 is used to indicate the number of valid payload bytes in the payload starting at the first byte following the TSHP field 320. A value of '0' is only valid when the payload is an idle timeslot (FIG. 7A). By using the number of expected bytes i.e., 53 for ATM cells, and the packet length field 326 (FIG. 7B), multiple cells or packets can be delineated and extracted.

The TSHP field 320 is the remainder of the division (modulo 2) by the generator polynomial $x^8+x^2+x+1$ of the contents of the OAM&P messages field 312, the PTI field 314, the PSP/CSP field 316 and the payload length field 318. The concatenation of these four fields constitutes a 40-bit data pattern over which the 8-bit TSHP field is calculated. At the transmitter in the remote terminal 14 (FIG. 1), the initial content of the register computing the remainder of the division is preset to all "0"s. The remainder of the division described above is transmitted as the 8-bit TSHP field. At the receiver in the central terminal 12 (FIG. 1), the starting value of the TSHP for checking is all "0"s. The TSHP field is used only to check for errors in the timeslot header 303 and not to correct the timeslot header for single bit errors. Timeslot headers with incorrect TSHP are ignored. With an incorrect TSHP, the timeslot payload is suspect and can be ignored; however, further upper layer protection schemes such as the HEC on ATM cells can also be relied upon.

The timeslot payload field 322 is organized differently depending on whether the payload contains packet data or ATM cell data. There is no CRC or like protection on the upstream timeslot payload field. The presence of partial payloads depends on the availability of data. Idle timeslots are transmitted even when no data is available.

As shown in FIG. 7B, packet data is byte aligned to the timeslot start delimiter 310. A new packet may start at any one of the timeslot payload field bytes. A partial packet 324 may begin the timeslot payload, followed by the start of a packet 325 indicated by the NSP value 316. If two or more packets start in one timeslot payload 322, the start of subsequent packets in the timeslot must be ascertained by reading the 16-bit length field 326 which is prefixed to each IP packet. As noted above, a remote terminal 14 (FIG. 1) can be provisioned to transmit in more than one upstream timeslot 302 for larger committed packet data rates.

As shown in FIG. 7C, ATM cells are also byte aligned to the timeslot start delimiter 310. A new cell may start at the beginning of any one of the timeslot payload field bytes. A partial ATM cell 332 may begin the timeslot payload, followed by the start of a cell 334 indicated by the CSP value 316. Since the start of an ATM cell need not be aligned with the end of the timeslot header protection field 320, there can be multiple whole ATM cells per each timeslot 302. Multiple cells are shown in FIG. 7C as cell #k 334, cell #k+1 336, through cell k+3 DS1 (or cell k+4 E1) 338.

If the ATM cells carry asynchronous, unstructured DS1/E1 circuit emulation traffic via the AAL1 protocol, only 47 of the 53 bytes in each cell are available for DS1 or E1 traffic. There is sufficient bandwidth in each timeslot to carry one full DS1 at a maximum instantaneous rate of 1.5460 Mb/s per timeslot (or one E1 at a maximum instantaneous rate of 2.050 Mb/s).

The upstream optical signal uses binary non-return-to-zero (NRZ) line coding. This signal is scrambled to assure an adequate number of transitions (zeros to ones, and ones to zeros) for line rate clock and data recovery at the receiver of the central terminal 12 (FIG. 1). The scrambler used is a frame (timeslot) synchronous scrambler that can be applied identically at the remote terminal transmitter and the central terminal receiver. The generating polynomial used in the scrambler is $x^{11}+x^2+1$.

The shift register generator of the scrambler is reset to "11111111111" on the most-significant bit of the byte following the final byte of the timeslot start delimiter field 310 (FIG. 6). That bit and all subsequent bits to be scrambled are added, modulo 2, to the output from the $x^{11}$ position of the scrambler. The scrambler runs continuously from that bit on throughout the remainder of the upstream timeslot. The scrambler is reset on every upstream timeslot. Note that the guard time, the timeslot sync pattern, and the timeslot start delimiter fields 306, 308 and 310, respectively, are not scrambled.

Figure 8:
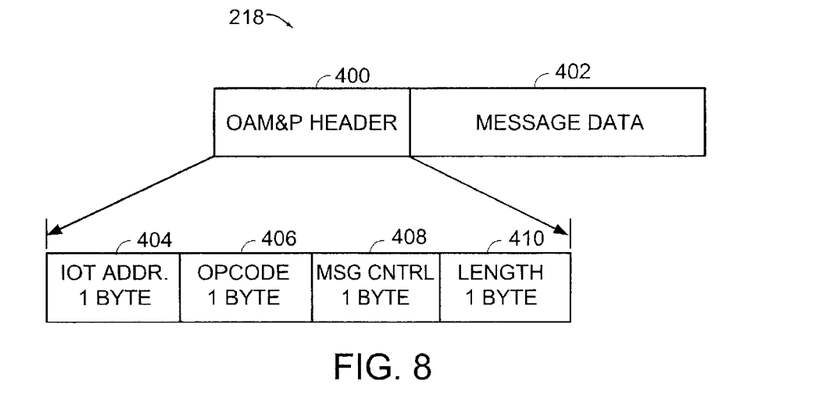
FIG. 8 illustrates a format for downstream OAM&P messages carried in the downstream subframe format of FIG. 3.

The downstream OAM&P message set is defined as a set of variable length messages, each no bigger than the OAM&P field 218 of a downstream subframe header 206 (FIG. 3). Each downstream subframe header 206 contains only one OAM&P message. Each OAM&P message is split into two sections, the OAM&P message header 400 and the message specific data section 402 as shown in FIG. 8. The OAM&P message header 400 includes an IOT address field 404, an opcode field 406, a message control field 408 and a length field 410.

All remote terminals 14 (FIG. 1) on the PON 16 receive all OAM&P messages transmitted by the central terminal 12. However, only the particular remote terminal with a provisioned IOT address matching the OAM&P IOT address field 404 actually processes the OAM&P message. The low order 6 bits of the OAM&P IOT address should match the 6-bit IOT address field 240 contained in the downstream cell header 232 or packet header 222 (FIGS. 5A, 5B).

The following opcodes are defined for the opcode field 406:

| Opcode | Value | Description |
| --- | --- | --- |
| Range_Notify | 0 | Alert remote terminal of a range condition |
| Range_Request | 1 | Command remote terminal to send a ranging burst |
| Assign_Id | 2 | Assign an IOT address |
| Set_Data | 3 | Write data to the remote terminal operational memory map |
| Get_Data | 4 | Get data from the remote terminal operational memory map |
| Reset | 5 | Reset a remote terminal |
| Reset_Counters | 6 | Reset remote terminal counters |
| Reset_Status | 7 | Reset remote terminal status |

The message control field 408 is composed of two 4-bit subfields, a control subfield and a message ID subfield. The control subfield tells the remote terminal how to respond to this particular OAM&P message. A control subfield value of 0 instructs the remote terminal to update only the 16 bit value used for the upstream OAM&P header 400. A control subfield value of 1 instructs the remote terminal to send an inband OAM&P response message. The message ID subfield provides a message tag for the remote terminal. This message ID is used by the remote terminal to update the 2-bit message tag value used for the upstream OAM&P header. The message tag is allocated and maintained by the system controller.

The length field 410 indicates the length of the OAM&P message in bytes (message header 400 and message data section 402). This value cannot exceed the size of the OAM&P field 218 of a downstream subframe header.

The message specific data section includes the following based on specific opcodes:

| Opcode | Message Specific Data |
|---|---|
| Range_Notify | None |
| Range_Request | None |
| Assign_Id | Serial Number, IOT Address |
| Set_Data | TLV encoded data |
| Get_Data | TLV encoded data |
| Reset | None |
| Reset_Counters | None |
| Reset_Status | Status mask |

The message specific data for the Set_Data opcode is encoded by tag, length and value:

TAG (2 bytes): indicates the offset into a section of remote terminal memory used for storing operational parameters;
LENGTH (2 bytes): indicates the amount of data sent, equals the size of the VALUE field in bytes;
VALUE (LENGTH bytes): the data to write to the remote terminal operational memory map.

The message specific data for the Get_Data opcode is encoded by tag, length and value:

TAG (2 bytes): indicates the offset into a section of remote terminal memory used for storing operational memory parameters;
LENGTH (2 bytes): indicates the size of the VALUE field in bytes, always set to 2;
VALUE (2 bytes): indicates the number of bytes to get for the response.

For upstream OAM&P messages, as noted above, each upstream timeslot 302 contains a 16-bit OAM&P message field 312. There are two formats defined for the upstream OAM&P message field, a status format and a data format which are transmitted in alternating frames. The status format includes the following fields:

INTR (1 bit): indicates a remote terminal interrupt condition;
STATUS (10 bits): status bits (System error | DS1 error | DS1 overrun | DS1 queue | ETH error | ETH overrun | ETH queue);
MSG_ID (2 bits): indicates the message ID of the last OAM&P message processed;
MSG_STATUS (3 bits): indicates the status of the last OAM&P message processed.

The data format includes 16 bits of data from the remote terminal operational memory map.

In summary, the present method and system provide an approach to support the aggregation of multiple broadband services including voice, high speed data, video and image through the transmission of packets and cells simultaneously over a passive optical network.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of communication between a central terminal and plural remote terminals over a passive optical network having a downstream portion and an upstream portion, the method comprising:

transmitting downstream data from the central terminal to the plural remote terminals in successive downstream frames over the downstream network portion, the downstream data including downstream packet data;

transmitting upstream data from the plural remote terminals to the central terminal in respective upstream timeslois over the upstream network portion, the upstream timeslots forming successive upstream frames, the upstream data including upstream packet data;

wherein the downstream data further includes downstream ATM cell data; and wherein each downstream frame comprises a first number of downstream subframes, each downstream subframe comprising a second number of downstream timeslots, each downstream timeslot having one of a plurality of downstream formats including a downstream packet format for carrying downstream packet data and a downstream cell format for carrying downstream ATM cell data.

2. The method of claim 1, wherein each downstream subframe further comprises a subframe header having a first field comprising a downstream sync pattern for synchronizing alignment of the downstream data received at the remote terminals and a second field comprising a downstream communication channel for communicating downstream control information to the remote terminals.

3. The method of claim 2 wherein the downstream control information includes provisioning information for provisioning upstream timeslots to respective remote terminals.

4. The method of claim 1 wherein the downstream packet format for carrying downstream packet data includes a downstream packet header and a downstream packet payload for carrying a portion or all of a single downstream packet; the downstream packet header having a first field identifying at least one of the plural remote terminals to receive the downstream packet data, a second field identifying a port of the at least one remote terminal identified in the first field to terminate the downstream packet data and a third field indicating whether the corresponding downstream packet payload includes an end of packet.

5. The method of claim 4 wherein the downstream packet payload includes a length field indicating a packet length of the corresponding packet.

6. The method of claim 1 wherein the downstream cell format for carrying downstream ATM cell data includes a downstream cell header and a downstream cell payload; the downstream cell header having a first field identifying at least one of the remote terminals to receive the downstream ATM cell data; the downstream cell payload including an ATM cell header having a first field identifying a port of the at least one remote terminal identified in the downstream cell header to terminate the downstream ATM cell data.

7. The method of claim 6 wherein the downstream cell payload includes circuit emulation service data according to AAL1 format.

8. The method of claim 6 wherein the downstream cell payload includes an ATM cell payload.

9. A method of communication between a central terminal and plural remote terminals over a passive optical network having a downstream portion and an upstream portion, the method comprising:

transmitting downstream data from the central terminal to the plural remote terminals in successive downstream frames over the downstream network portion, the downstream data including downstream packet data;

transmitting upstream data from the plural remote terminals to the central terminal in respective upstream timeslots over the upstream network portion, the upstream timeslots forming successive upstream frames, the upstream data including upstream packet data;

wherein the upstream data further includes upstream ATM cell data;

wherein each upstream timeslot includes an upstream header and an upstream payload; the upstream header including a first field for a guard time, a second field comprising an upstream timeslot sync pattern for synchronizing phase alignment of the upstream data received at the central terminal, a third field comprising an upstream timeslot start delimiter for byte alignment of the upstream data received at the central terminal and a fourth field comprising an upstream communication channel for communicating upstream control information to the central terminal from the respective remote terminal.

10. The method of claim 9 wherein the upstream header further includes a fifth field comprising a payload type indicator having a first value indicating packet data and a second value indicating ATM cell data.

11. A method of communication between a central terminal and plural remote terminals over a passive optical network having a downstream portion and an upstream portion, the method comprising:

transmitting downstream data from the central terminal to the plural remote terminals in successive downstream frames over the downstream network portion, the downstream data including downstream packet data;

transmitting upstream data from the plural remote terminals to the central terminal in respective upstream timeslots over the upstream network portion, the upstream timeslots forming successive upstream frames, the upstream data including upstream packet data;

wherein the upstream data further includes upstream ATM cell data;

wherein each upstream timeslot has one of a plurality of upstream formats including an upstream packet format for carrying upstream packet data and an upstream cell format for carrying upstream ATM cell data.

12. The method of claim 11 wherein the upstream packet format for carrying upstream packet data includes an upstream packet header and an upstream packet payload; the upstream packet header including a first field identifying a next packet start byte in the upstream packet payload and a second field indicating length of the upstream packet payload.

13. The method of claim 12 wherein the upstream packet payload includes at least a portion of a packet.

14. The method of claim 13 wherein the upstream packet payload includes multiple packets.

15. The method of claim 11 wherein the upstream cell format for carrying upstream ATM cell data includes an upstream cell header and an upstream cell payload; the upstream cell header including a first field identifying a next ATM cell start byte in the upstream cell payload and a second field indicating length of the upstream cell payload.

16. The method of claim 15 wherein the upstream cell payload includes at least a portion of an ATM cell.

17. The method of claim 16 wherein the upstream cell payload includes multiple ATM cells.

18. The method of claim 15 wherein the upstream cell payload includes circuit emulation service data according to AAL1 format.

19. The method of claim 11 wherein transmitting upstream data includes transmitting upstream data from at least one of the plural remote terminals in multiple upstream timeslots.

20. The method of claim 19 wherein the multiple upstream timeslots are non-contiguous.

21. A communication system comprising:

a shared medium having a downstream portion and an upstream portion;

a central terminal; and a plurality of remote terminals coupled to the shared medium for communicating with the central terminal;

the central terminal transmitting downstream data to the plural remote terminals in successive downstream frames over the downstream shared medium portion, the downstream data including downstream packet data;

the plural remote terminals transmitting upstream data to the central terminal in respective upstream timeslots over the upstream shared medium portion, the upstream timeslots forming successive upstream frames, the upstream data including upstream packet data;

wherein the downstream data further includes downstream ATM cell data; and wherein each downstream frame comprises a first number of downstream subframes, each downstream subframe comprising a second number of downstream timeslots, each downstream timeslot having one of a plurality of downstream formats including a downstream packet format for carrying downstream packet data and a downstream cell format for carrying downstream ATM cell data.

22. The communication system of claim 21 wherein each downstream subframe further comprises a downstream communication channel for communicating downstream control information to the remote terminals.

23. The communication system of claim 22 wherein the downstream control information includes provisioning information for provisioning upstream timeslots to respective remote terminals.

24. The communication system of claim 21 wherein the downstream packet format for carrying downstream packet data includes a downstream packet header and a downstream packet payload for carrying a portion or all of a single downstream packet; the downstream packet header having a first field identifying at least one of the plural remote terminals to receive the downstream packet data, a second field identifying a port of the at least one remote terminal identified in the first field to terminate the downstream packet data and a third field indicating whether the corresponding downstream packet payload includes an end of packet.

25. The communication system of claim 21 wherein the downstream cell format for carrying downstream ATM cell data includes a downstream cell header and a downstream cell payload; the downstream cell header having a first field identifying at least one of the remote terminals to receive the downstream ATM cell data; the downstream cell payload including an ATM cell header having a first field identifying a port of the at least one remote terminal identified in the downstream cell header to terminate the downstream ATM cell data.

26. The communication system of claim 25 wherein the downstream cell payload includes circuit emulation service data according to AAL1 format.

27. A communication system comprising:
   a shared medium having a downstream portion and an upstream portion;
   a central terminal; and
   a plurality of remote terminals coupled to the shared medium for communicating with the central terminal;
   the central terminal transmitting downstream data to the plural remote terminals in successive downstream frames over the downstream shared medium portion, the downstream data including downstream packet data;
   the plural remote terminals transmitting upstream data to the central terminal in respective upstream timeslots over the upstream shared medium portion, the upstream timeslots forming successive upstream frames, the upstream data including upstream packet data;
   wherein the upstream data further includes upstream ATM cell data; and
   wherein each upstream timeslot includes an upstream header and an upstream payload; the upstream header including a first field for a guard time, a second field comprising an upstream timeslot sync pattern for synchronizing phase alignment of the upstream data received at the central terminal, a third field comprising an upstream timeslot start delimiter for byte alignment of the upstream data received at the central terminal and a fourth field comprising an upstream communication channel for communicating upstream control information to the central terminal from the respective remote terminal.

28. A communication system comprising:
   a shared medium having a downstream portion and an upstream portion;
   a central terminal; and
   a plurality of remote terminals coupled to the shared medium for communicating with the central terminal;
   the central terminal transmitting downstream data to the plural remote terminals in successive downstream frames over the downstream shared medium portion, the downstream data including downstream packet data;
   the plural remote terminals transmitting upstream data to the central terminal in respective upstream timeslots over the upstream shared medium portion, the upstream timeslots forming successive upstream frames, the upstream data including upstream packet data;
   wherein the upstream data further includes upstream ATM cell data;
   wherein each upstream timeslot has one of a plurality of upstream formats including an upstream packet format for carrying upstream packet data and an upstream cell format for carrying upstream ATM cell data.

29. The communication system of claim 28 wherein the upstream packet format for carrying upstream packet data includes an upstream packet header and an upstream packet payload; the upstream packet header including a first field identifying a next packet start byte in the upstream packet payload and a second field indicating length of the upstream packet payload.

30. The communication system of claim 29 wherein the upstream packet payload includes at least a portion of a packet.

31. The communication system of claim 30 wherein the upstream packet payload includes multiple packets.

32. The communication system of claim 28 wherein the upstream cell format for carrying upstream ATM cell data includes an upstream cell header and an upstream cell payload; the upstream cell header including a first field identifying a next ATM cell start byte in the upstream cell payload and a second field indicating length of the upstream cell payload.

33. The communication system of claim 32 wherein the upstream cell payload includes at least a portion of an ATM cell.

34. The communication system of claim 33 wherein the upstream cell payload includes multiple ATM cells.

35. The communication system of claim 28 wherein the upstream timeslots form successive upstream TDMA frames.

36. Apparatus for communicating with plural remote terminals over a passive optical network having a downstream portion and an upstream portion, the apparatus comprising:
   a transmitter for transmitting downstream data to the plural remote terminals in successive downstream frames over the downstream network portion, the downstream data including downstream packet data; and
   a receiver for receiving from the plural remote terminals upstream data in respective upstream timeslots over the upstream network portion, the upstream timeslots forming successive upstream frames, the upstream data including upstream packet data;
   wherein the downstream data further includes downstream ATM cell data and the upstream data further includes upstream ATM cell data;
   wherein each downstream frame comprises a first number of downstream subframes, each downstream subframe comprising a second number of downstream timeslots, each downstream timeslot having one of a plurality of downstream formats including a downstream packet format for carrying downstream packet data and a downstream cell format for carrying downstream ATM cell data.

37. The apparatus of claim 36 wherein each downstream subframe further comprises a downstream communication channel for communicating provisioning information for provisioning upstream timeslots to respective remote terminals.

38. The apparatus of claim 36 wherein the downstream packet format for carrying downstream packet data includes a downstream packet header and a downstream packet payload for carrying a portion or all of a single downstream packet; the downstream packet header having a first field identifying at least one of the plural remote terminals to receive the downstream packet data, a second field identifying a port of the at least one remote terminal identified in the first field to terminate the downstream packet data and a third field indicating whether the corresponding downstream packet payload includes an end of packet.

39. The apparatus of claim 36 wherein the downstream cell format for carrying downstream ATM cell data includes a downstream cell header and a downstream cell payload; the downstream cell header having a first field identifying at least one of the remote terminals to receive the downstream ATM cell data; the downstream cell payload including an ATM cell header having a first field identifying a port of the at least one remote terminal identified in the downstream cell header to terminate the downstream ATM cell data.

40. Apparatus for communicating with plural remote terminals over a passive optical network having a downstream portion and an upstream portion, the apparatus comprising:

a transmitter for transmitting downstream data to the plural remote terminals in successive downstream frames over the downstream network portion, the downstream data including downstream packet data; and a receiver for receiving from the plural remote terminals upstream data in respective upstream timeslots over the upstream network portion, the upstream timeslots forming successive upstream frames, the upstream data including upstream packet data;

wherein the downstream data further includes downstream ATM cell data and the upstream data further includes upstream ATM cell data;

wherein each upstream timeslot has one of a plurality of upstream formats including an upstream packet format for carrying upstream packet data and an upstream cell format for carrying upstream ATM cell data.

41. The apparatus of claim 40 wherein the upstream packet format for carrying upstream packet data includes an upstream packet header and an upstream packet payload; the upstream packet header including a first field identifying a next packet start byte in the upstream packet payload and a second field indicating length of the upstream packet payload.

42. The apparatus of claim 40 wherein the upstream cell format for carrying upstream ATM cell data includes an upstream cell header and an upstream cell payload; the upstream cell header including a first field identifying a next ATM cell start byte in the upstream cell payload and a second field indicating length of the upstream cell payload.

43. A remote terminal for communicating with a central terminal over a passive optical network having a downstream portion and an upstream portion, the apparatus comprising:

a receiver for receiving downstream data from the central terminal in successive downstream frames over the downstream network portion, the downstream data including downstream packet data; and a transmitter for transmitting upstream data to the central terminal in at least one upstream timeslot over the upstream network portion, the at least one upstream timeslot and respective upstream timeslots from other remote terminals forming successive upstream frames, the upstream data including upstream packet data;

wherein the downstream data further includes downstream ATM cell data and the upstream data further includes upstream ATM cell;

wherein each downstream frame comprises a first number of downstream subframes, each downstream subframe comprising a second number of downstream timeslots, each downstream timeslot having one of a plurality of downstream formats including a downstream packet format for carrying downstream packet data and a downstream cell format for carrying downstream ATM cell data.

44. A remote terminal for communicating with a central terminal over a passive optical network having a downstream portion and an upstream portion, the apparatus comprising:

a receiver for receiving downstream data from the central terminal in successive downstream frames over the downstream network portion, the downstream data including downstream packet data; and a transmitter for transmitting upstream data to the central terminal in at least one upstream timeslot over the upstream network portion, the at least one upstream timeslot and respective upstream timeslots from other remote terminals forming successive upstream frames, the upstream data including upstream packet data;

wherein the downstream data further includes downstream ATM cell data and the upstream data further includes upstream ATM cell;

wherein each upstream timeslot includes an upstream header and an upstream payload; the upstream header including a first field for a guard time, a second field comprising an upstream timeslot sync pattern for synchronizing phase alignment of the upstream data, a third field comprising an upstream timeslot start delimiter for byte alignment of the upstream data and a fourth field comprising an upstream communication channel for communicating upstream control information from the respective remote terminal.

45. A remote terminal for communicating with a central terminal over a passive optical network having a downstream portion and an upstream portion, the apparatus comprising:

a receiver for receiving downstream data from the central terminal in successive downstream frames over the downstream network portion, the downstream data including downstream packet data; and a transmitter for transmitting upstream data to the central terminal in at least one upstream timeslot over the upstream network portion, the at least one upstream timeslot and respective upstream timeslots from other remote terminals forming successive upstream frames, the upstream data including upstream packet data;

wherein the downstream data further includes downstream ATM cell data and the upstream data further includes up stream ATM cell data;

wherein each upstream timeslot has one of a plurality of upstream formats including an upstream packet format for carrying upstream packet data and an upstream cell format for carrying upstream ATM cell data.

46. The remote terminal of claim 45 wherein the upstream packet format for carrying upstream packet data includes an upstream packet header and an upstream packet payload; the upstream packet header including a first field identifying a next packet start byte in the upstream packet payload and a second field indicating length of the upstream packet payload.

47. The remote terminal of claim 45 wherein the upstream cell format for carrying upstream ATM cell data includes an upstream cell header and an upstream cell payload; the upstream cell header including a first field identifying a next ATM cell start byte in the upstream cell payload and a second field indicating length of the upstream cell payload.

48. A TDMA frame for transmission from plural remote terminals to a central terminal over a passive optical network, the TDMA frame comprising:

plural timeslots each having one of a plurality of timeslot formats including a packet format for carrying packet data; the packet format including a packet header and a packet payload; the packet header including a first field identifying a next packet start byte in the packet payload and a second field indicating length of the packet payload.

49. The TDMA frame of claim 48 wherein the plurality of timeslot formats further includes a cell format for carrying ATM cell data; the cell format including a cell header and a cell payload; the cell header including a first field identifying a next ATM cell start byte in the cell payload and a second field indicating length of the cell payload.

50. The TDMA frame of claim 48 wherein each timeslot includes a header and a payload; the header including a first field for a guard time, a second field comprising a timeslot sync pattern for synchronizing phase alignment of the timeslot data, a third field comprising a timeslot start delimiter for byte alignment of the timeslot data and a fourth field comprising a communication channel for communicating control information from the respective remote terminal.

* * * * *